United States Patent
Bubbio

(10) Patent No.: US 11,308,377 B2
(45) Date of Patent: Apr. 19, 2022

(54) METHOD FOR REGISTERING AND IDENTIFYING A USER OF AN INSTITUTION THROUGH A BIOMETRIC INFORMATION AND REGISTRATION SYSTEM AND IDENTIFICATION DEVICE THEREOF

(71) Applicant: Panini S.p.A., Turin (IT)

(72) Inventor: Pierpaolo Bubbio, Turin (IT)

(73) Assignee: Panini S.P.A., Turin (IT)

( * ) Notice: Subject to any disclaimer, the term of this patent is extended or adjusted under 35 U.S.C. 154(b) by 0 days.

(21) Appl. No.: 16/786,589

(22) Filed: Feb. 10, 2020

(65) Prior Publication Data
US 2020/0257947 A1 Aug. 13, 2020

(30) Foreign Application Priority Data

Feb. 11, 2019 (IT) .......................... 102019000001959

(51) Int. Cl.
  *G06K 19/06* (2006.01)
  *G06F 21/60* (2013.01)
  *H04L 9/30* (2006.01)
(52) U.S. Cl.
  CPC ..... *G06K 19/06028* (2013.01); *G06F 21/602* (2013.01); *G06K 19/06037* (2013.01); *H04L 9/30* (2013.01); *G06F 2221/2107* (2013.01)
(58) Field of Classification Search
  CPC ........ G06K 19/06028; G06K 19/06037; G06F 21/602; G06F 2221/2107; G06F 21/45; G06F 21/32; H04L 9/30; H04L 63/0428; H04L 9/3247; H04L 9/0894;
  (Continued)

(56) References Cited

U.S. PATENT DOCUMENTS

| 10,154,031 B1 | 12/2018 | Lerner |
| 2006/0075255 A1 | 4/2006 | Duffy et al. |
| 2006/0157559 A1 | 7/2006 | Levy et al. |

(Continued)

FOREIGN PATENT DOCUMENTS

KR   10-2017-0114713 A   10/2017

OTHER PUBLICATIONS

N. A. Albahbooh and P. Bours, "A Mobile Phone Device as a Biometrics Authentication Method for an ATM Terminal," 2015 IEEE International Conference on Computer and Information Technology (Year: 2015).*

(Continued)

*Primary Examiner* — Matthew Mikels
(74) *Attorney, Agent, or Firm* — Workman Nydegger

(57) ABSTRACT

A method for registering and identifying a user of an institution through biometric information is described, along with the associated registration system and identification device, wherein said registration method (100) comprises the steps of:
  obtaining (102) biometric information in digital format about said user, said biometric information comprising at least one fingerprint of said user;
  obtaining (108) personal information in digital format about said user;
  generating (110) a file from said personal information and said biometric information;
  encrypting (112) said file with a private key, so as to obtain an encrypted file;
  generating (114) a bar code from said encrypted file.

9 Claims, 3 Drawing Sheets

(58) Field of Classification Search
CPC .. H04L 63/0861; H04L 9/3231; H04W 12/77; H04W 12/06; H04W 12/03
See application file for complete search history.

(56) References Cited

U.S. PATENT DOCUMENTS

| | | |
|---|---|---|
| 2006/0177106 A1 | 8/2006 | Wrage |
| 2007/0078780 A1 | 4/2007 | Tran et al. |
| 2014/0157384 A1* | 6/2014 | Stern .................... G06F 21/32 726/7 |
| 2014/0254796 A1 | 9/2014 | Li et al. |
| 2017/0243041 A1* | 8/2017 | Arce ............... G06K 19/06056 |
| 2018/0225488 A1 | 8/2018 | Aichberger |

OTHER PUBLICATIONS

Italian Search Report dated Sep. 17, 2019, issued in Italian Application No. 102019000001959, filed Feb. 11, 2019.
French Search Report dated Nov. 2, 2021, issued in French Application No. 2001249.

* cited by examiner

METHOD FOR REGISTERING AND IDENTIFYING A USER OF AN INSTITUTION THROUGH A BIOMETRIC INFORMATION AND REGISTRATION SYSTEM AND IDENTIFICATION DEVICE THEREOF

BACKGROUND OF THE INVENTION

1. The Field of the Invention

The present invention relates to a method for registering and identifying a user of an institution through biometric information, as well as to the associated registration system and identification device.

2. The Relevant Technology

In order to validate a user of a service and ascertain his/her identity, tools are known in the art which are adapted to obtain biometric information about the user, e.g., by capturing one or more of his/her fingerprints, and to store such biometric information into a file that can then be compared with other files of the same kind to obtain a similarity confidence index as a result.

By wisely storing, on a one-off basis, the file containing the customer's biometric information into a non-modifiable medium at an instant when his/her identity is ascertained, it will be possible to identify him/her at a later time on the basis of the biometric information alone.

Still with reference to fingerprints, and assuming that the user goes to a counter of an institution, e.g., a bank, the principal assumption of the clerk will be: "if the fingerprint captured at this instant from this person is equal to the fingerprint captured in the past from a user with ascertained identity XY, then the person in front of me is really XY".

Therefore, the above-described procedure includes a single registration phase ("enrolment") and a virtually unlimited number of subsequent verification phases ("match") for verifying the customer's identity.

In the registration phase (enrolment), the new user is registered for the first time. The user must be identified with certainty, so as to be univocally associated with specific biometric information of his/her own that can subsequently be relied upon for his/her identification.

To do so, the user exhibits a valid document verified as such, e.g., by means of specialized anti-fraud databases, and places one or more fingers onto a fingerprint scanner until the device (whether directly or through a verification application) indicates that the scan has been made correctly.

At this point, the data of the scanned fingerprint are converted into a file that digitally represents, through known techniques, the characteristic details thereof.

Once this result has been obtained, the typical approaches of prior-art systems are the following two:
 a) taking the user's fingerprint information just obtained and digitally associating it with personal information about the same, e.g., first name and surname, in the form of a binary file or stream; in substance, the institution (e.g., a bank) takes care of storing the customer's biometric information within its own structure, typically in an owned server or on cloud; or, as an alternative,
 b) the fingerprint information can be returned to the user, thus eliminating most risks connected to the creation and maintenance of a biometric database. The method currently in use according to the prior art is to record the digital information on a debit card issued by the same institution, so that it can be easily extracted whenever necessary and used as will be further specified below.

In the verification (match) phase that must follow the registration (enrolment) phase, the registered user goes to the institution, which requests his/her identification, e.g., in order to provide a given service.

According to this procedure, the client must scan at least one of his/her "live" fingers on a scanning device and then inserts his/her own debit card into the scanning device that contains the digital information about that same finger, recorded during the registration phase, so that the scanning device will extract the contents thereof: this is typically done by letting the debit card interact with the scanning device through an NFC (Near Field Communication) chip aboard the debit card.

At this point, the scanning device compares, whether directly or through a verification application, the digital information obtained by scanning the "live" finger with the digital information pre-recorded during the registration phase, returning a confidence index indicating the similarity between the two. If said confidence index exceeds a pre-defined threshold set by the institution in accordance with its own security policies, it can be asserted that the person's identity matches the one verified at registration time, and the service requested by the user can be provided.

The above-described prior-art solutions suffer, however, from some undeniable criticalities.

The first solution, i.e., storing biometric information into a single centralized database of the customers' biometric data, is challenging from an information technology viewpoint because it may prejudice the features of a user's privacy emphasized by the European GDPR ("General Data Protection Regulation") guidelines, resulting in the need for consulting a priori the Privacy Guarantor. Such a solution also requires a complex information technology structure, since it must be able to send a user's biometric information to any geographic location where the user may decide to request a service from the institution.

Conversely, the second solution, which involves storing the biometric information on a debit card of the user, saves the institution from having to create and maintain a centralized database of the users' biometric information, since the digital information remains owned by the user.

However, this second solution encounters a number of practical difficulties. In fact, debit card management is often entrusted to bodies external to the institution (e.g., Visa and Mastercard in the banking field) and, for obvious security reasons, the addition a posteriori of biometric information is a complex operation for already enrolled customers, for whom the debit card has already been issued and is not necessarily equipped with an on-board chip capable of storing external information. In the best of cases, the institution would incur additional costs and should nevertheless have already the operative debit card of the user at its disposal for a certain period of time, thus causing him/her considerable inconvenience.

SUMMARY OF THE INVENTION

It is therefore one object of the present invention to provide a method for registering and identifying a user of an institution through biometric information, as well as the associated registration system and identification device, wherein the biometric information is kept by the user without the institution incurring considerable additional costs.

It is a further object of the present invention to provide a method for registering and identifying a user of an institution through biometric information, as well as the associated registration system and identification device, wherein the user's biometric information is used in a quick, easy and secure manner.

These and other objects of the invention are achieved through a method for registering and identifying a user of an institution through biometric information, as well as the associated registration and identification devices, as claimed in the appended claims, which are an integral part of the present description.

BRIEF DESCRIPTION OF THE DRAWINGS

The above objects will become more apparent in light of the detailed description of a method for registering and identifying a user of an institution through biometric information, and the associated registration system and identification device, with particular reference to the annexed Figures, wherein:

With reference to FIG. 1, there is shown a method 100 for registering a new user for identifying the same at an institution, e.g., a bank, for the purpose of providing a service.

DETAILED DESCRIPTION OF THE PREFERRED EMBODIMENTS

Figure 2:
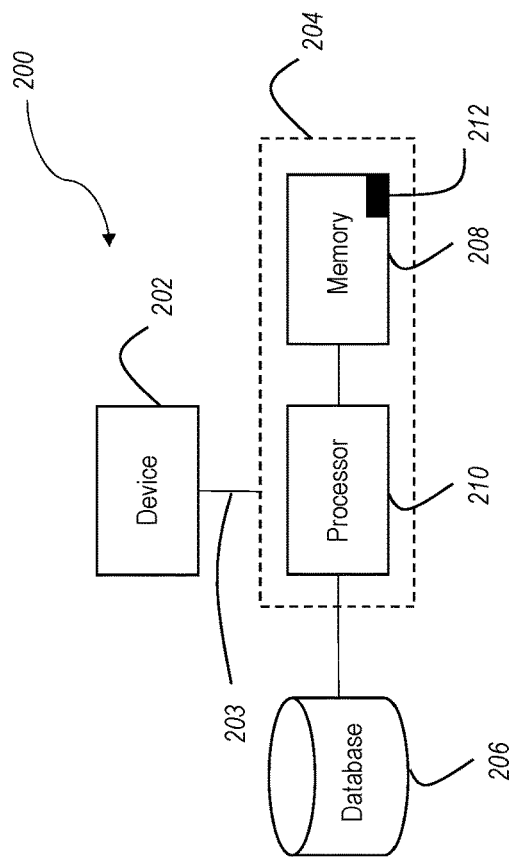
FIG. 2 shows a block diagram of a user registration system used in the method illustrated in FIG. 1.
Figure 1:
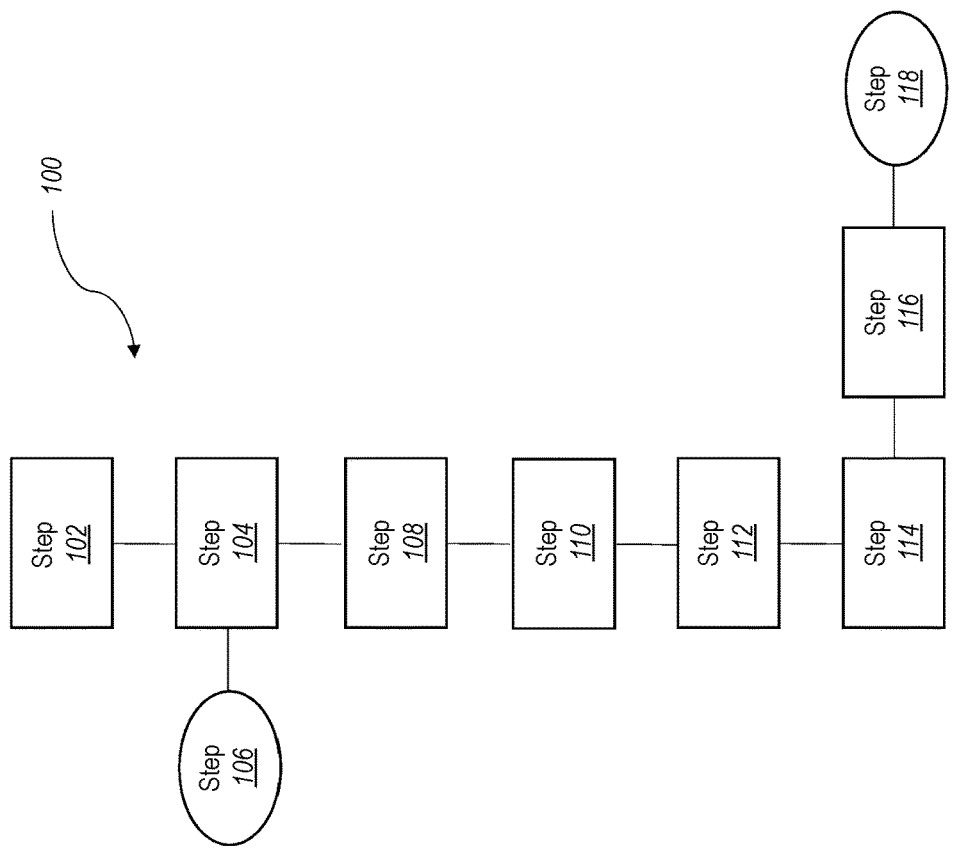
FIG. 1 shows a flow chart of a method for registering a user of an institution according to the present invention.

The institution is equipped with a registration system 200, illustrated in FIG. 2, comprising a device 202 adapted to obtain biometric information about the user, in particular a fingerprint scanner, connected via a connection 203 (e.g., a USB port, a wireless network or a LAN cable) to a computer 204 of the institution, so that it can send to the computer 204 said biometric information, which is stored into memory means 208 associated with the computer 204.

The computer 204 further comprises a processor 210, an operating system and software for handling the process described herein.

At step 102 the user, who has a valid identification document (e.g., an electronic identity card), goes to a service-providing institution, e.g., a bank. Through the device 202, biometric information is taken from the user, wherein the biometric information comprises one or more fingerprints of the user.

At step 104 the validity of the identification document is verified by the institution by means of the computer 204, e.g., by connecting to a database (not shown) of identification documents. Should the identification document be invalid, the procedure will be interrupted (step 106): in such a case, the registration method will restart from step 102 if the user can exhibit another identification document.

At step 108 the computer 204 accesses a personal information database 206 containing an identity record for each user of the institution, and retrieves personal information about the user on the basis of the information contained in the identity document exhibited by the user, storing it into the memory means 208. Said identity record contains at least one personal information that allows discerning one user of the institution univocally from another.

Such personal information may comprise, for example, the first name and surname and/or a user code assigned by the institution and/or, in the case of a banking institution, the user's bank account number.

At step 110 the computer 204 generates a file containing both the biometric information obtained through the device 202 and the personal information, and stores it into the memory means 208.

At step 112 the processor 210 of the computer 204 encrypts said file with a private key, which is exclusively known to the institution, is not disclosed externally, and is stored in a secure memory area 212 of said memory means 208, so as to obtain an encrypted file. Said encrypted file is a binary file of variable length, typically a few kilobytes.

At step 114 the computer 204 generates a bar code from the encrypted file, in particular a two-dimensional bar code, the density of which allows for easy storage of the information contained in the encrypted file. Said two-dimensional bar code is, for example, a Data Matrix or QR Code.

Note that, should said bar code be lost, stolen or illegally copied, it would only return to an ill-intentioned person a wholly unintelligible encrypted binary stream that would be impossible to read (in order to extract the personal and/or biometric information about its legitimate owner) and, most importantly, to rewrite (by an ill-intentioned person wanting to create a bar code containing his own personal and biometric data).

At step 116 the bar code thus generated is advantageously transferred to the user, so that he/she can exhibit it digitally in order to be identified the next time that he/she accesses the institution.

The bar code can be transferred to the user at step 116 in many ways. The most straightforward one is to print the bar code on a dedicated plastic card, so that it can be read by an optical reader available at the institution.

In a simpler embodiment, which advantageously does not require the creation of a new card, the bar code can be sent to a nomadic device of the user comprising a screen, in particular a smartphone, via SMS text, e-mail or a dedicated app, and then be displayed on the screen of the same nomadic device at identification time.

According to a further embodiment that may be implemented should the user be unable or unwilling to provide his/her own telephone number or e-mail address, it is sufficient to physically print the bar code on a paper medium and ask the customer to take a photo of it by means of his/her nomadic device at the end of the registration phase, or simply keep it.

The registration method 100 ends at step 118.

Figure 3:
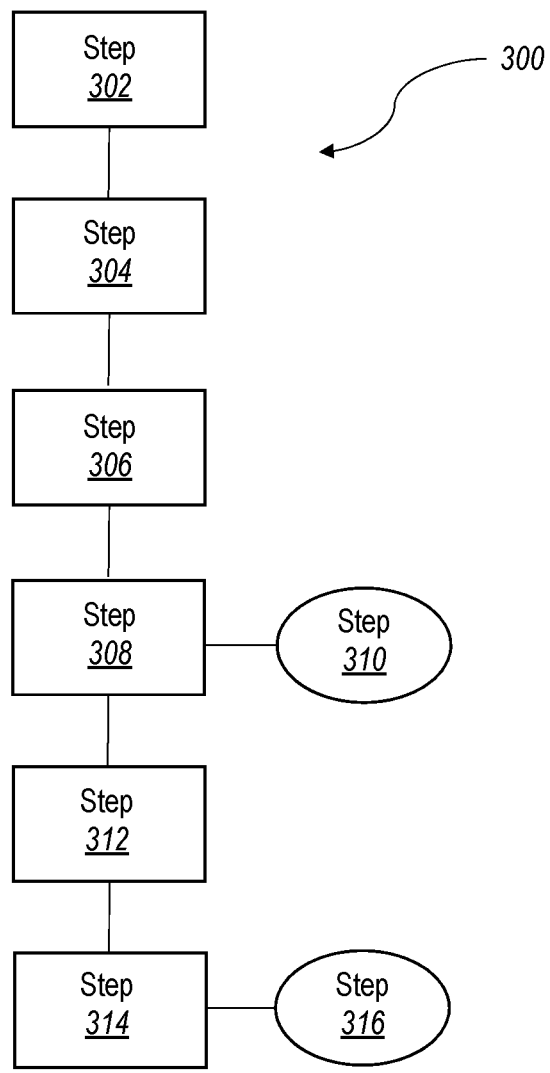
FIG. 3 shows a flow chart of a method for identifying the user of the institution according to the present invention.

With reference to FIG. 3, there is shown a method 300 for identifying a user at an institution, e.g., a bank, for the purpose of providing a service.

Figure 4B:
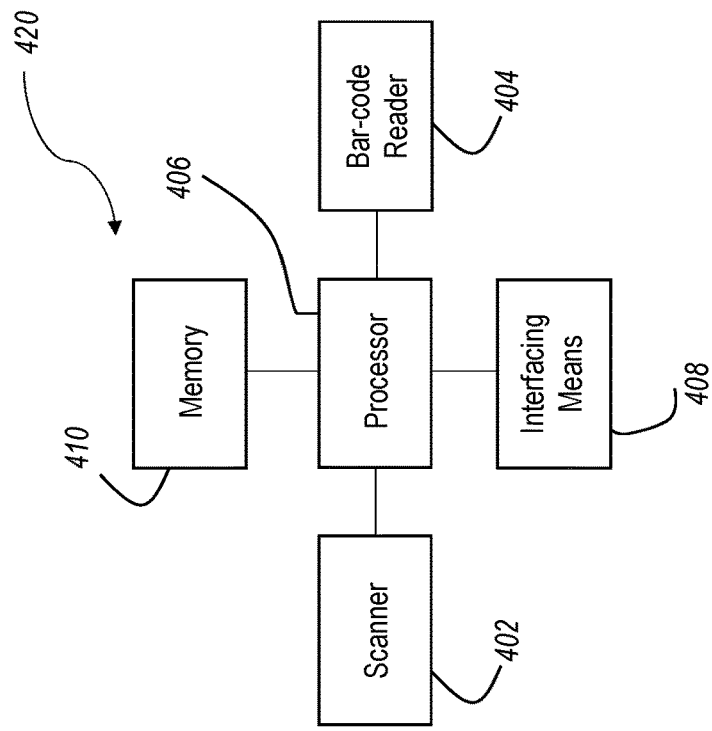
FIGS. 4a and 4b respectively show a device for identifying a user of an institution and a corresponding block diagram according to the present invention.
Figure 4A:
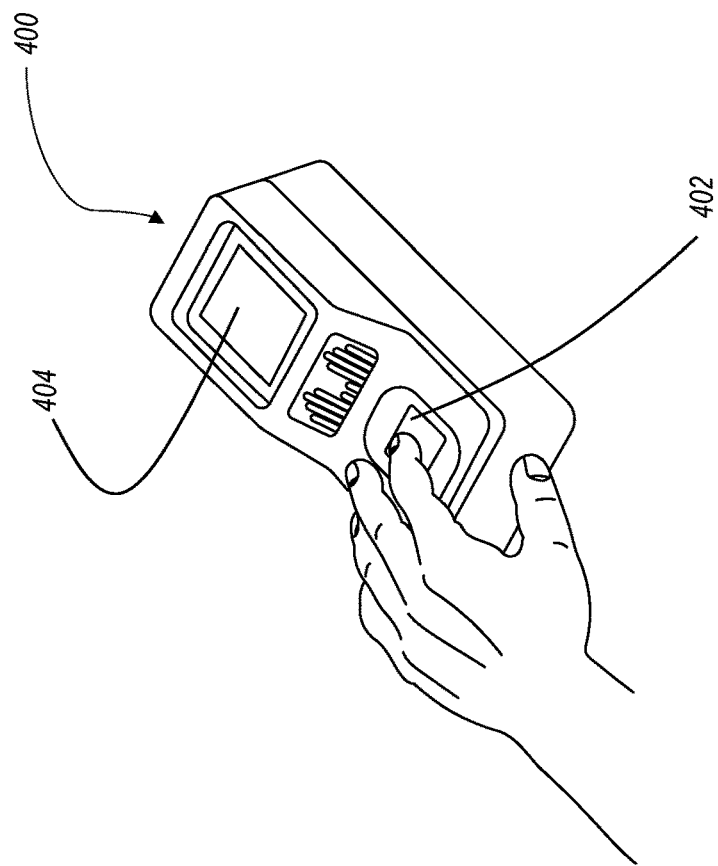

With reference to FIGS. 4a and 4b, there is shown, respectively, a stand-alone identification device 400 and an associated block diagram 420 as used in the identification method 300, which makes it possible to carry out the majority of the operations described below in conditions of utmost security, minimizing computer-to-computer transfers of sensitive data.

Such device 400 for identifying a user of an institution comprises:
a fingerprint scanner 402 of a known type, e.g., 1000 DPI, IAFIS certified, single-finger or multi-finger;
an optical bar-code reader 404 of a known type;
a processor 406 with associated firmware;

interfacing means 408 for interfacing with the outside environment, for receiving and sending out commands and data (e.g., through a USB port or a LAN network via the HTTPS protocol);

memory means 410, where the public key corresponding to the private key owned by the institution is stored, which will allow decoding the content of the bar code;

an operating system, which, in association with said processor 406, is adapted to control the fingerprint scanner 402, the optical bar-code reader 404, the interfacing means 408 and the memory means 410;

a computer program product, in particular portions of software code adapted to implement the steps of the method illustrated below, assuming that all sensitive operations, such as biometric information treatment and comparison, result outputting, and interfacing with the outside world, are carried out aboard the identification device 400.

At step 302 (FIG. 3) the user goes to the institution, bringing with him/her the bar code generated in the registration phase.

As already highlighted, the bar code may be contained in a plastic or paper medium, or else be stored in a nomadic device comprising a screen, in particular a smartphone.

At step 304 the user exhibits the bar code to the optical reader 404 of the identification device 420 of the institution. If the bar code is stored in the nomadic device, the user must of course be able to recall it on the screen. As an alternative, it may be envisaged to install some software, in particular an app, in the nomadic device, the purpose of which is to retrieve the bar code on a one-off basis from the image folder of the nomadic device and then, every time the app is launched, display it on the screen of the nomadic device, so adapted that it can be read by the optical reader 404.

At step 306 the identification device 420 extracts the data contained in the bar code and decrypts them by means of the public key associated with the private key which is known to the institution alone.

This decryption permits obtaining personal information and biometric information exactly corresponding to the information entered at steps 108 and 110 of the registration method 100. Such information is stored into the memory means 410 of the identification device.

At step 308 the personal information is used by the institution in order to load, from the personal database 206, the identity record of the customer. Of course, the procedure will be interrupted in the event that no customer of the institution is associated with the previously extracted personal information (step 310).

At step 312 the user places the same "live" finger used in the registration method 100 onto the optical fingerprint reader 404 of the identification device 420.

At step 314 the digital information obtained by scanning the "live" finger is compared by the identification device 400 with the digital information extracted from the bar code and, if the matching exceeds a confidence index predefined by the institution, it will be ascertained that the user who has placed the "live" finger onto the optical fingerprint reader 404 of the identification device 400 corresponds to the user contained in the identity record of the institution. Hence, services can be provided by the institution.

The identification method 300 ends at step 316.

The features of the present invention, as well as the advantages thereof, are apparent from the above description.

On the institution side, one advantage offered by the present invention is that an institution wanting to identify a user does not have to incur considerable additional costs, since the registration operation can be carried out by means of simple operating software not requiring great implementation efforts.

Moreover, still as regards the institution side, the user identification device comprises hardware and software currently available at very low cost.

On the user side, the biometric information is not, advantageously, transferred to the institution, since the latter, once the registration procedure is complete, will not store it into its own archives.

Furthermore, the biometric information is contained in a bar code which is virtually useless to ill-intentioned persons, which can be replicated unlimitedly, and which can advantageously be stored into a nomadic device of the user, as well as onto a paper or plastic medium.

The method for registering and identifying a user of an institution through biometric information and the associated registration system and identification device described herein by way of example may be subject to many possible variations without departing from the novelty spirit of the inventive idea; it is also clear that in the practical implementation of the invention the illustrated details may have different shapes or be replaced with other technically equivalent elements.

For example, instead of taking the fingerprint of just one finger of the user, the registration procedure may envisage to take fingerprints of at least two fingers of the user. Of course, the identification procedure may envisage to scan the fingerprints of at least two fingers of the user, or else to take just one fingerprint and then, if the confidence index is not fully reached, take a second digital fingerprint of the user.

It can therefore be easily understood that the present invention is not limited to a method for registering and identifying a user of an institution through biometric information and the associated registration system and identification device, but may be subject to many modifications, improvements or replacements of equivalent parts and elements without departing from the inventive idea, as clearly specified in the following claims.

The invention claimed is:

1. An identification and verification device for identifying and verifying a user of an institution, said device comprising:

a fingerprint scanner;

an optical bar-code reader;

interfacing means for receiving and sending out commands and data;

memory means for storing a public key corresponding to a private key owned by said institution;

a processor; and an operating system, which, in association with said processor, is adapted to control said fingerprint scanner, said optical bar-code reader, said interfacing means and said memory means, wherein said processor is adapted to:

receive an encrypted data stream produced by said optical bar-code reader reading a bar code associated with said user, said bar code having been generated by encrypting, with said private key of said institution, a file containing first personal information in digital format and first biometric information in digital format about said user so that said first personal information and said first biometric information are incorporated into said bar code, said first biometric information comprising at least one fingerprint of said user, wherein the first biometric information is prevented from being transferred or stored in a personal information database of the institution;

decrypt, with said public key, said encrypted data stream to extract said first personal information and said first biometric information contained in said bar code;

attempt to load, using said first personal information, second personal information from said personal information database of said institution, said second personal information having been previously registered in an identity record of a registered user, the identity record being stored in the personal information database of said institution, wherein the personal information database did not store the first biometric information such that the identity record does not include the first biometric information;

in response to successful loading of said second personal information from the personal information database using the first personal information, obtain second biometric information in digital format via scanning a fingerprint of said user by said fingerprint scanner, wherein the second biometric data is also prevented from being stored in the personal information database;

compare said first biometric information obtained by decrypting said encrypted file with said second biometric information obtained by said fingerprint scanner to determine a similarity confidence index indicating similarity between said first biometric information and said second biometric information, wherein said comparison between the first biometric information and the second biometric information is performed without reliance on the personal information database as a result of the personal information database not storing either one of the first biometric information or the second biometric information; and in response to determining that said similarity confidence index exceeds a predefined threshold, identify and verify said user as said registered user with certainty.

2. The identification device according to claim 1, wherein the interfacing means comprises a USB port or a LAN network.

3. The identification device according to claim 1, wherein said first personal information comprises a first name and a surname of said user.

4. The identification device according to claim 1, wherein said first personal information comprises a customer code associated with said institution of said user.

5. The identification device according to claim 1, wherein said first personal information comprises banking information of said user.

6. The identification device according to claim 5, wherein said banking information comprises a bank account number.

7. The identification device according to claim 1, wherein said bar code is a two-dimensional one.

8. The identification device according to claim 1, wherein said bar code is within an SMS text or e-mail, or is printed on a plastic or paper medium, or is visualized on a screen of a nomadic device.

9. The identification device according to claim 1, wherein said bar code is a Data Matrix or QR code.

* * * * *